US012572277B2

(12) United States Patent
Sandberg et al.

(10) Patent No.:  US 12,572,277 B2
(45) Date of Patent:  Mar. 10, 2026

(54) TECHNIQUE FOR MANAGING COMPRESSION OF DATA IN AN APPARATUS

(71) Applicant: Arm Limited, Cambridge (GB)

(72) Inventors: Andreas Lars Sandberg, Cambridge (GB); Håkan Lars-Göran Persson, Arlöv (SE); Thomas Philip Speier, Wake Forest, NC (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/675,561

(22) Filed: May 28, 2024

(65) Prior Publication Data

US 2025/0370618 A1  Dec. 4, 2025

(51) Int. Cl.
G06F 3/06  (2006.01)

(52) U.S. Cl.
CPC .......... G06F 3/0608 (2013.01); G06F 3/0638 (2013.01); G06F 3/0673 (2013.01)

(58) Field of Classification Search
CPC ...... G05B 13/00–048; G05B 15/00–02; G05B 17/00–02; G06F 1/00–3296;

(Continued)

(56) References Cited

U.S. PATENT DOCUMENTS 6,020,975 A * 2/2000 Chen .......................... G06T 9/00
                                                            358/1.11
6,876,813 B1 * 4/2005 Matsui ................... H04N 5/772
                                                            386/230

(Continued)

OTHER PUBLICATIONS

Definition of "while"; Merriam-Webster Dictionary; retrieved from https://web.archive.org/web/20191219051107/https://www.merriam-webster.com/dictionary/while (Year: 2019).*

(Continued)

*Primary Examiner* — Daniel C. Chappell
(74) *Attorney, Agent, or Firm* — NIXON & VANDERHYE P.C.

(57) ABSTRACT

An apparatus is described having a processing element to perform data processing operations on data accessible in memory. The processing element identifies accesses to a given memory region of the memory using addresses specified within an uncompressed address space, whilst a storage device used to implement the memory provides, for the given memory region, a given pool of storage locations within a compressed address space. Compression circuitry is arranged, for a block of data to be written to an address within the given memory region, to perform a compression evaluation operation to determine a selected format in which the block of data is to be written to the given pool of storage locations, the selected format being chosen from an uncompressed format where a plurality M of storage locations are to be used to store the block of data, and one or more compressed formats where a number of storage locations less than M are to be used to store the block of data. The compression circuitry maintains a plurality of write credits in association with the given pool of storage locations, where the number of write credits is dependent on the number of storage locations within the given pool and the write credits are used to reserve storage locations within the given pool. The processing element is constrained, prior to issuing a write request seeking to write a given block of data to a given address within the given memory region, to obtain a sufficient number of the write credits to ensure that M storage locations within the given pool will be available when in due course the compression circuitry is triggered to perform the compression evaluation operation for the given block of data.

20 Claims, 9 Drawing Sheets

(58) Field of Classification Search
CPC ............... G06F 3/00; G06F 3/06–0689; G06F
5/00–16; G06F 8/00–78; G06F 9/00–548;
G06F 11/00–3696; G06F 12/00–16; G06F
13/00–4295; G06F 15/00–825; G06F
16/00–986; G06F 18/00–41; G06F
17/00–40; G06F 21/00–88; G06F
2009/3883; G06F 2009/45562–45595;
G06F 2015/761–768; G06F 2201/00–885;
G06F 2206/00–20; G06F 2209/00–549;
G06F 2211/00–902; G06F 2212/00–7211;
G06F 2213/00–4004; G06F 2216/00–17;
G06F 2221/00–2153; G06N 3/00–126;
G06N 5/00–048; G06N 7/00–08; G06N
10/00; G06N 20/00–20; G06N
99/00–007; G06T 1/00–60; G06V
30/00–43; G11B 20/00–24; G11B
33/00–1493; G11C 11/00–5692; G11C
13/00–06; G11C 14/00–009; G11C
15/00–06; G11C 16/00–3495; G11C
17/00–18; G11C 2207/00–229; G11C
2216/00–30; H01L 25/00–50; H01L
2225/00–1094; H03M 7/00–707; H04L
9/00–38; H04L 12/00–66; H04L
41/00–5096; H04L 49/00–9094; H04L
61/00–59; H04L 67/00–75
See application file for complete search history.

(56) References Cited

U.S. PATENT DOCUMENTS

| | | | | |
|---|---|---|---|---|
| 2009/0164715 | A1* | 6/2009 | Astigarraga | G06F 12/08 |
| | | | | 711/112 |
| 2012/0221875 | A1* | 8/2012 | Bak | G06F 9/4418 |
| | | | | 713/323 |
| 2012/0284239 | A1* | 11/2012 | Agarwala | G06F 16/1744 |
| | | | | 707/693 |
| 2014/0189281 | A1* | 7/2014 | Sokol, Jr. | G06F 3/0664 |
| | | | | 711/171 |
| 2018/0060235 | A1* | 3/2018 | Yap | G06F 12/04 |
| 2021/0216455 | A1* | 7/2021 | Uhrenholt | G06F 9/30196 |
| 2021/0217131 | A1* | 7/2021 | Uhrenholt | G06F 12/023 |

OTHER PUBLICATIONS

Definition of "whilst"; Merriam-Webster Dictionary; retrieved from
https://web.archive.org/web/20190105215007/https://www.merriam-
webster.com/dictionary/whilst (Year: 2019).*
International Search Report and Written Opinion of the International Searching Authority for PCT/GB2025/050717 mailed Jun.
23, 2025, 15 pages.

* cited by examiner

130

BLOCK OF DATA
(EG CACHE LINE'S WORTH OF DATA)

UNCOMPRESSED FORMAT 132            134            136            138

| STORAGE LOCATION 1 | STORAGE LOCATION 2 | STORAGE LOCATION 3 | STORAGE LOCATION 4 |

COMPRESSED FORMAT 1

132            134

| STORAGE LOCATION 1 | STORAGE LOCATION 2 |

COMPRESSED FORMAT 2

132

| STORAGE LOCATION 1 |

TECHNIQUE FOR MANAGING COMPRESSION OF DATA IN AN APPARATUS

BACKGROUND

The present technique relates to the handling of data within a data processing apparatus, and in particular to techniques for managing compression of such data.

In modern data processing systems, it can be desirable to use compression techniques in order to seek to increase the capacity of a memory system. However it can be beneficial, for example for performance reasons, to enable the processing elements that are processing data not to be involved with the decision as to whether data is compressed or not when it is written to memory. Instead, it may be desirable to allow a processing element to merely issue a write request when it is desired to write a block of data to memory, with the decision then subsequently being taken elsewhere in the system as to whether to compress that block of data or not prior to writing the data to the storage device providing the physical memory.

Such an approach allows the compression of data in memory to be managed in a manner that is transparent to the processing element or elements operating on the data. A processing element can hence issue a write request to write a block of data, commit the store instruction that caused the write to take place, and continue with additional processing, with a later decision being made transparently to the processing element as to whether the data can be compressed or not before being written to memory. However, a problem can then arise in some instances if it is not possible to compress data sufficiently. In particular, for a given memory region that can be addressed by a processing element, the size of that given memory region as viewed by the processing element may exceed the actual physical storage capacity of the storage locations allocated within the storage device to store data for that given memory region. This could lead to a scenario where, for a given block of data being written, it is later determined that there is insufficient physical storage available to store that block of data, due for example to that block of data not being compressible, and/or there being a relatively low level of compression achieved in respect of data already stored within the storage device for the given memory region.

Such an approach would be highly problematic in the above scenario, as the processing element has already committed the write and moved on to other processing. However, it will typically be infeasible for performance reasons to stall the processing element until it is known whether there is sufficient space to store the block of data being written. Accordingly it would be desirable to develop a technique that allowed the transparent and efficient use of compression techniques in memory, without adversely impacting performance of data processing operations.

SUMMARY

In accordance with a first example arrangement, there is provided an apparatus comprising: a processing element to perform data processing operations on data accessible in memory, wherein the processing element is arranged to identify accesses to a given memory region of the memory using addresses specified within an uncompressed address space, whilst a storage device used to implement the memory provides, for the given memory region, a given pool of storage locations within a compressed address space;

and compression circuitry arranged, for a block of data to be written to an address within the given memory region, to perform a compression evaluation operation to determine, in dependence on the block of data, a selected format in which the block of data is to be written to the given pool of storage locations, wherein the selected format is chosen from an uncompressed format where a plurality M of storage locations are to be used to store the block of data, and one or more compressed formats where a number of storage locations less than M are to be used to store the block of data; wherein: the compression circuitry is arranged to maintain a plurality of write credits in association with the given pool of storage locations, where the number of write credits is dependent on the number of storage locations within the given pool and the write credits are used to reserve storage locations within the given pool; and the processing element is constrained, prior to issuing a write request seeking to write a given block of data to a given address within the given memory region, to obtain a sufficient number of the write credits to ensure that M storage locations within the given pool will be available when in due course the compression circuitry is triggered to perform the compression evaluation operation for the given block of data.

In accordance with another example arrangement, there is provided a method of managing compression of data in an apparatus, comprising: performing within a processing element data processing operations on data accessible in memory, wherein the processing element identifies accesses to a given memory region of the memory using addresses specified within an uncompressed address space, whilst a storage device used to implement the memory provides, for the given memory region, a given pool of storage locations within a compressed address space; performing a compression evaluation operation within compression circuitry to determine, for a block of data to be written to an address within the given memory region, a selected format in which the block of data is to be written to the given pool of storage locations, wherein the selected format is chosen from an uncompressed format where a plurality M of storage locations are to be used to store the block of data, and one or more compressed formats where a number of storage locations less than M are to be used to store the block of data; maintaining a plurality of write credits in association with the given pool of storage locations, where the number of write credits is dependent on the number of storage locations within the given pool and the write credits are used to reserve storage locations within the given pool; and constraining the processing element, prior to issuing a write request seeking to write a given block of data to a given address within the given memory region, to obtain a sufficient number of the write credits to ensure that M storage locations within the given pool will be available when in due course the compression circuitry is triggered to perform the compression evaluation operation for the given block of data.

In accordance with a still further example arrangement, there is provided a system comprising: an apparatus in accordance with the first example arrangement discussed above, implemented in at least one packaged chip; at least one system component; and a board, wherein the at least one packaged chip and the at least one system component are assembled on the board. In an additional example arrangement, the above-mentioned system may be assembled on a further board with at least one other product component.

In a yet further example arrangement, there is provided a computer-readable medium storing computer-readable code for fabrication of an apparatus in accordance with the first example arrangement discussed above. The computer-readable medium may be a transitory computer-readable medium (such as wired or wireless transmission of code over a network) or a non-transitory computer-readable medium such as semiconductor, magnetic disk, or optical disc.

BRIEF DESCRIPTION OF THE DRAWINGS

Further aspects, features and advantages of the present technique will be apparent from the following description of examples, which is to be read in conjunction with the accompanying drawings, in which.

DESCRIPTION OF EXAMPLES

Figure 1:
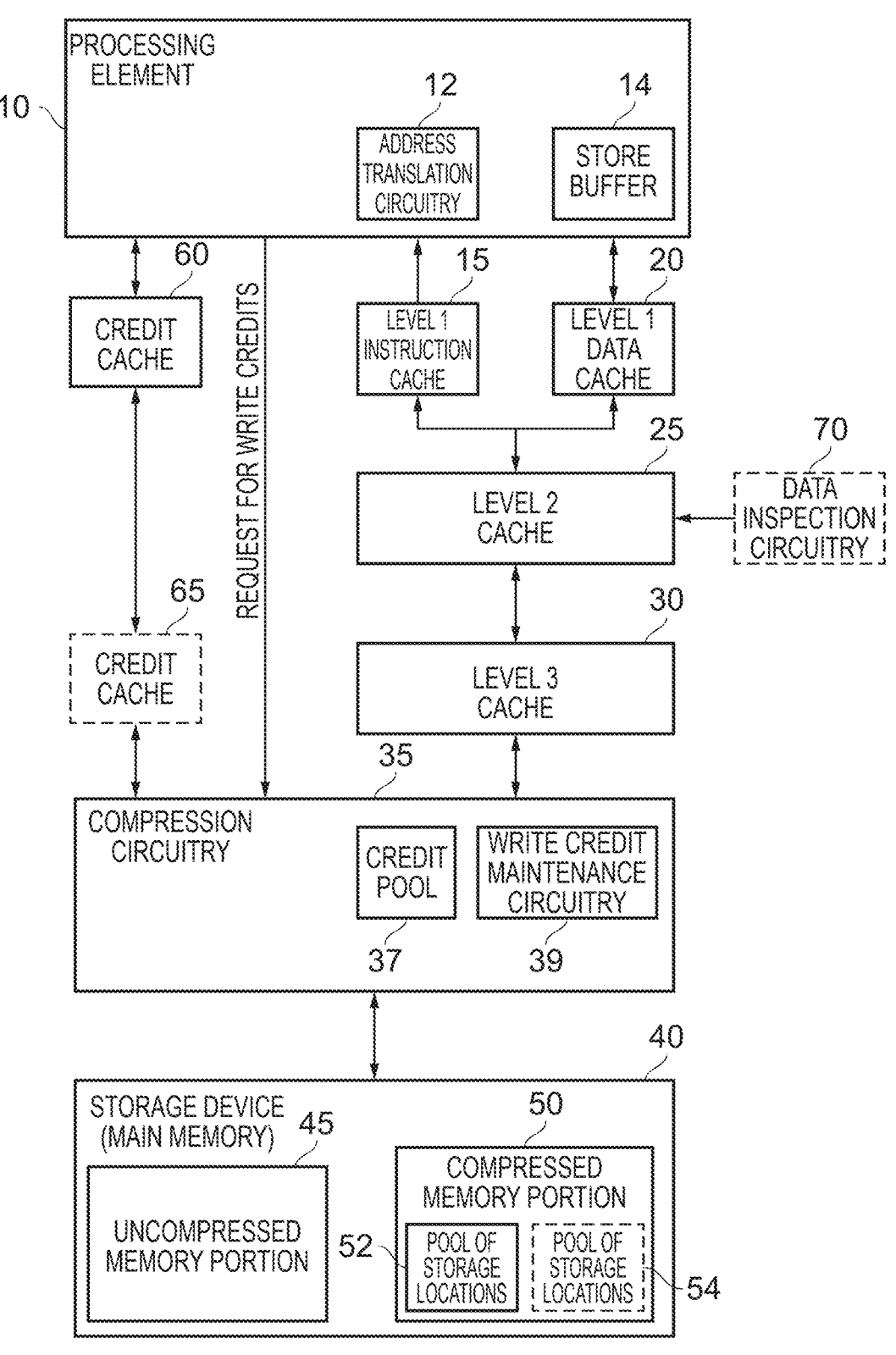
FIG. 1 is a block diagram of a system in accordance with one example arrangement.

In accordance with the techniques described herein, an apparatus may be provided with a processing element to perform data processing operations on data accessible in memory. The processing element may be arranged to identify accesses to a given memory region of the memory using addresses specified within an uncompressed address space, whilst a storage device used to implement the memory provides, for the given memory region, a given pool of storage locations within a compressed address space. Typically, the storage capacity of the given pool of storage locations will be insufficient to store in uncompressed form all of the data that may be allocated within the given memory region, and in this respect the storage device can be said to be overcommitted.

The size of the given memory region may vary dependent on implementation, and in some implementations there may be multiple memory regions within the uncompressed address space that are each mapped to respective pools of storage locations within the compressed address space. It should also be noted that in some implementations it may be the case that not all of the storage device is used as compressed memory, and that another portion of the storage device may be provided as an uncompressed memory portion.

The apparatus further has compression circuitry arranged, for a block of data to be written to an address within the given memory region, to perform a compression evaluation operation to determine, in dependence on the block of data, a selected format in which the block of data is to be written to the given pool of storage locations. The selected format is chosen from an uncompressed format where a plurality M of storage locations are to be used to store the block of data, and one or more compressed formats where a number of storage locations less than M are to be used to store the block of data. Whilst in some implementations there may be only a single compressed format in addition to the uncompressed format, in other implementations there may be multiple different compressed formats available for use. Typically, whether any particular compressed format can be used will depend on the data values forming the block of data in question, and in one example implementation the compression circuitry can be arranged to evaluate the data values forming the block of data, in order to determine whether it is possible to compress the block of data or not, with the data typically being compressed if it is possible to do so. Where more than one compressed format is available, the compression circuitry may be arranged to determine whether any of the compressed formats can be used, and in the event that more than one of the compressed formats can be used, will then be arranged to choose one of those compressed formats, for example the compressed format that achieves the best level of compression.

As mentioned previously, one problem that can arise is due to the latency between the time the processing element issues a write request seeking to write a block of data, and the time at which the compression circuitry determines whether that data can be compressed or not. In particular, once the processing element has issued the write request it is important to ensure that the data can be written, but due to the fact that the storage device has been overcommitted (the capacity of the given pool of storage locations within the compressed address space is insufficient to store in uncompressed form all of the data allocated within the given memory region), a situation could arise where, for a particular block of data that has been written by the processing element, it is later determined by the compression circuitry that there is insufficient space in the storage device to store that block of data.

In order to alleviate this problem, the techniques described herein use a system of write credits managed by the compression circuitry. In particular, the compression circuitry is arranged to maintain a plurality of write credits in association with the given pool of storage locations, where the number of write credits is dependent on the number of storage locations within the given pool, and the write credits are used to reserve storage locations within the given pool. The actual correlation between the number of write credits required and the number of storage locations within the given pool may vary dependent on implementation. For example, in one implementation it may be the case that the number of write credits is equal to the number of storage locations, i.e. that there is one write credit for each storage location, but in other implementations the actual number of write credits may be somewhat less than the number of storage locations. Purely by way of illustrative example, in a system that has an uncompressed format where two storage locations are required to store a block of data and a single compressed format where one storage location is required to store a block of data, it may be sufficient to provide one write credit for each pair of storage locations, with that one write credit being needed to enable a block of data to be stored in the uncompressed format.

With such a system of write credits in place, then in accordance with the techniques described herein the processing element is constrained, prior to issuing a write request seeking to write a given block of data to a given address within the given memory region, to obtain a sufficient number of the write credits to ensure that M storage locations within the given pool will be available when in due course the compression circuitry is triggered to perform the compression evaluation operation for the given block of data. This approach hence ensures that a sufficient number of storage locations will be available within the given pool of storage locations in the event that the selected format for the given block of data is in due course determined to be the uncompressed format. When the compression circuitry later determines whether the given block of data can or cannot be compressed, then any unneeded write credits can be released to make them available for reuse in association with other write requests.

By use of the above approach, it is possible to accommodate a delay between the processing element issuing a write request, and a decision being taken as to how much, if at all, the block of data identified by the write request can be compressed, whilst ensuring that it can be guaranteed that the write operation will complete (i.e. the block of data will be stored in the storage device) once the write request has been issued by the processing element.

There are a number of reasons why there may be a delay between the write request being issued by the processing element, and a determination as to whether to compress the data being taken. For example, the processing element may be connected to the storage device via a bus network, with the controller for the storage device making a decision as to whether to compress any given block of data or not. In this event, the latency arises due to the time taken to transport the write data over the bus network to the controller for the storage device. In another example implementation, it may be the case that one or more levels of data cache are provided between the processing element and the storage device, with the compression circuitry being associated with the storage device or with a level of cache relatively remote from the processing element. Indeed, in some implementations separate compression circuits could be associated with multiple different locations in the cache/memory hierarchy, for instance with a level of cache and with the storage device. This would, for example, allow data to be first compressed using a subset of compression algorithms and then potentially further compressed closer to memory using further compression algorithms. In such a system, this means that write credits could potentially be released in both compressions stages.

The write credits can be managed in a variety of ways. However, in one example implementation, each write credit is initialised as an available credit, and is arranged to become a bound credit when associated with data to be stored in the given pool of storage locations. When adopting such an approach, the earlier-mentioned sufficient number of the write credits obtained by the processing element for association with the given block of data may be considered to be bound credits unavailable for use in association with other blocks of data.

As will be apparent from the earlier discussion, the number of write credits initially obtained by the processing element will be a number sufficient to ensure that the given block of data can be stored in the uncompressed format if necessary. The compression circuitry can then be arranged, if performance of the compression evaluation operation identifies that a given compressed format is to be used to store the given block of data, to cause at least one bound credit associated with the given block of data to be converted back to an available credit. In particular, if it is determined that the data can be compressed, there will then be at least one write credit initially reserved for the write operation that is no longer required, and hence that write credit can be freed up for reuse. In implementations where more than one compressed format is supported, then the number of write credits that can be converted back to available credits may depend on the degree of compression that can be used.

In one particular example implementation, the compression circuitry is arranged, on performing the compression evaluation operation, to determine how many of the obtained write credits to maintain as bound credits, in dependence on the number of storage locations in the given pool required to store the given block of data in the selected format.

In order to improve performance, then in one example implementation a mechanism may be provided to allow the processing element to cache one or more write credits to improve speed of access to those write credits when needed. For example, in one implementation the compression circuitry may be arranged to maintain a credit pool of available credits, and the apparatus may further comprise a credit cache accessible to the processing element, wherein the credit cache is employed to cache one or more of the available credits transferred from the credit pool in order to reserve those one or more of the available credits for use by the processing element. In one example implementation, the processing element may, at certain points in time, or in response to certain events, request that the compression circuitry transfers one or more of the available credits from the credit pool to the processing element's credit cache.

Further, occurrence of certain events (which may be referred to herein as eviction trigger events) may cause one or more available credits to be evicted from the credit cache to enable them to be returned to the credit pool maintained by the compression circuitry. In some examples, an available credit evicted from the processing element's above-mentioned credit cache may be returned directly to the credit pool maintained by the compression circuitry, but in other example implementations there may be one or more additional intervening levels of credit cache between the processing element's credit cache and the credit pool. For example, it may be the case that there are multiple processing elements in the system, each of which may have its own associated credit cache, but which might also share access to a lower level shared credit cache located between the credit pool maintained by the compression circuitry and the local credit caches of each processing element.

It should also be noted that the storage used by the compression circuitry to maintain the credit pool, and to keep track of the state of each write credit used in association with the given pool of storage locations, can take a variety of forms. For instance, whilst this information may be maintained within main memory, the compression circuitry may itself have access to one or more local storage structures, for example a cache, in which to maintain at least a portion of that information.

In one example implementation, the processing element is arranged, on detection of a first given event, to request from the compression circuitry a transfer into the credit cache of one or more available credits from the credit pool. In one example implementation, it may be the case that virtual addresses are used by the software executed by the processing element, with address translation circuitry (for example a memory management unit) being used to convert virtual addresses into physical addresses using address translation information maintained in page tables in memory. As will be understood by those of ordinary skill in the art, often such address translation information is cached in association with the address translation circuitry in a structure called a translation lookaside buffer (TLB). In one example implementation it may be decided to seek to reserve the earlier-mentioned sufficient number of write credits required to write the given block of data at or around the time address translation is performed. Hence, as one particular example of the above-mentioned first given event, the allocation of an entry in the TLB can be used as a trigger to request one or more write credits for caching in the processing element's credit cache, since it is expected that write requests in respect of addresses within the physical address range covered by that TLB entry are likely to be made in due course.

In a similar manner, the processing element may be arranged, on detection of a second given event, to cause one or more available credits to be evicted from the credit cache. When adopting the above approach associated with TLB allocation, then a suitable example of a second given event may be an invalidation of a TLB entry. In particular, once a TLB entry has been invalidated, it is expected that write accesses to physical addresses within the physical address range covered by that invalidated TLB entry are not likely in the near future, and hence write credits associated with a corresponding memory region are less likely to be needed.

In some instances, it may be that an individual memory region for which the above-mentioned write credit mechanism is used to reserve storage locations within the storage device is larger than a region of memory covered by a TLB entry. In such instances, on a first relevant TLB entry allocation, one or more available credits may be requested from the credit pool for storing in an entry of the credit cache as per the mechanism described above. In addition, a reference counter can be maintained in association with that entry in the credit cache. Each time a TLB entry is allocated for an address range falling within the corresponding memory region for which the cached write credits are being used, the reference counter may be incremented, and each time such a TLB entry is invalidated the reference counter may be decremented. When the reference counter is decremented to zero this can be used as a trigger to evict the associated write credits from the credit cache for returning to the global credit pool. Use of a reference counter may also be useful in some implementations to handle aliasing issues (where multiple virtual address ranges point to the same physical address range), so as to keep track of when it is appropriate to evict from the credit cache any credits no longer needed.

In accordance with an example implementation of the techniques described herein, each write credit may be able to be transitioned between a plurality of states. In one particular example implementation, the plurality of states comprise:

a memory free (MF) state in which the write credit is an available credit in the credit pool;

a memory bound (MB) state in which the write credit is a bound credit associated with data stored in the given pool of storage locations;

a cached free (CF) state in which the write credit is an available credit in the credit cache; and a cached bound (CB) credit in which the write credit is a bound credit associated with data cached in a data cache located in a path between the processing element and the compression circuitry.

In one particular example implementation, the compression circuitry may include write credit maintenance circuitry to keep track of how the various write credits are being used, and in particular to track the various states of the write credits. There are a number of ways in which the states could be tracked. For example, the write credit maintenance circuitry may maintain a multi-bit field (for instance, in the above specific example a two bit field) for each write credit, to identify the current state of that write credit, or alternatively may be arranged instead to maintain counters to track how many write credits are in each of the supported (in the above example, four) states.

Whilst all four of the above example states could be tracked by the write credit maintenance circuitry, in one example implementation it may be the case that the compression circuitry does not need to distinguish between use of the cached free and the cached bound state, since both of those states represent write credits that have been made available to a processing element for use in association with data cached within a level of cache between the processing element and the compression circuitry.

As discussed earlier, write credits are initialised as available credits, but become bound credits when associated with data to be stored in the given pool of storage locations. Such data may not immediately be written into the storage device, but instead may be cached. For instance, in one example implementation there may be at least one data cache located in a path between the processing element and the compression circuitry. In such an implementation, the at least one cache may be arranged to maintain, in association with each block of data cached therein, an indication of any bound credits associated with that block of data. When using an implementation that employs the four states discussed earlier, then any bound credits associated with a cached block of data may be considered to be CB credits. There are various ways in which the indication of such bound credits can be maintained by a cache. For example, for each cache line of data held within the cache, the corresponding TAG entry used to maintain an address indication for the cache line, along with certain status information such as whether the cache line is valid, whether the cache line is dirty, etc., can be extended to also provide an indication of the number of bound credits associated with that cache line.

In one example implementation, the number of bound credits associated with any given cache line's worth of data may be dependent on the state in which that data is stored within the cache. For example, for a dirty cache line in the cache, the maximum number of required bound credits may be maintained, i.e. sufficient to enable the data to be stored in uncompressed form within M storage locations of the pool. Similarly, clean cache lines that are known to be uncompressible may also have the maximum number of required bound credits associated with them. However, clean compressed cache lines (i.e. representing data that has previously been written to memory and determined to be compressible, irrespective of whether that data is stored in compressed or uncompressed form when loaded into the cache) may have associated with it up to the number of bound credits needed to enable the data to be stored in memory in that known compressed form.

When maintaining an indication of bound credits in association with cache lines cached within a data cache, then that information can be re-referenced at a future point in time when the processing element is performing a further write operation. For instance, in one example implementation, when a current block of data associated with the given address is cached in the at least one data cache and the given block of data associated with the write request represents updated data for the given address, the processing element is arranged to take into account any bound credits indicated by the data cache as already being associated with the current block of data when determining the sufficient number of write credits.

For example, it is often the case that when the processing element seeks to write data, a lookup in such a data cache is first performed to see if a current version of the data is already cached within the cache, and if so the block of data forming that cache line is retrieved so that the new write data can be merged with the existing cache line data to generate an updated version of the cache line for issuing as a block of data to be written. Assuming a hit does occur in the data cache when performing such a lookup, then the processing element can at that point take account of any bound credits already associated with the cache line when deciding how many additional bound credits, if any, are needed.

In one particular implementation, the processing element may have already reserved, prior to any cache lookup being performed, a sufficient number of write credits to ensure that M storage locations within the pool will be available. For example, it may be considered appropriate to perform such a reservation of write credits on or around the time any address translation is performed to convert a virtual address into a physical address in memory, or at least at an early enough point in time that it is possible to take remedial action, such as raising an exception, if there are insufficient credits available. When adopting such a scheme, then if in due course a hit is detected in the data cache, and one or more bound credits are already associated with the cache line, then a corresponding number of bound credits that had originally been reserved can be released, for example returning them to the earlier-mentioned credit cache.

In one example implementation, in the event that the processing element is unable to obtain the sufficient number of write credits required to enable the write request to be issued, then the processing element may be arranged to trigger a remedial action to seek to identify any bound credits that can be converted back to available credits.

The remedial action can take a variety of forms, but some examples of possible remedial actions that could be taken are one or more of:

flushing any pending write requests from store buffer circuitry of the processing element;
  propagating one or more write requests to the compression circuitry to cause the compression evaluation operation to be performed; and/or
  requesting flushing of a credit cache associated with another processing element within the apparatus.

By flushing pending write requests from the store buffer circuitry of the processing element, this can identify situations where more credits than are needed had been reserved by the processing element previously, for example at address translation time. For instance, as part of such a flushing operation, the earlier-mentioned cache lookup process may occur, and if this results in a hit on a cache line that already has some bound credits associated with it, then this will enable a number of bound credits to be released (since as discussed earlier the initial reservation will have already covered the worst case, i.e. sufficient credits to ensure that M storage locations will be available).

As another example, by propagating one or more write requests to the compression circuitry to cause the compression evaluation operation be performed, at that point the actual number of bound credits needed can be determined, enabling any bound credits no longer necessary to be released back as available credits. Such a process could be implemented for example by initiating a cache clean (write back) operation in respect of one or more cache lines.

Regarding the earlier-mentioned option of requesting flushing of a credit cache associated with another processing element, this can be beneficial, as the other processing element may have a number of available write credits locally cached, which could be returned to the credit pool of available credits for subsequent allocation to the processing element seeking to perform a write operation, or indeed in some implementations may be able to be transferred directly from the other processing element's credit cache into the writing processing element's credit cache. There are various ways in which such flushing of a credit cache could be initiated. For example, the processing element that has been unable to reserve enough write credits may contact the compression circuitry requesting that it triggers flushing of a credit cache associated with another processing element, but in alternative implementations it may be possible to trigger such a flushing of a credit cache without needing to route any request via the compression circuitry. For example, one processing element may be able to request another processing element to release write credits from its local credit cache.

In some example implementations, on detection of a write credit deficiency event the processing element may be arranged to trigger an exception to flag an out of memory condition. This can then be used to hand over control to the operating system or hypervisor, to trigger an exception handling routine in software to seek to resolve the out of memory condition. In some instances, this approach may be taken as soon as it is determined that the processing element is unable to obtain a sufficient number of write credits, or alternatively some of the above-mentioned remedial actions could be taken first and only if those remedial actions do not work may the write credit deficiency event be considered to have been detected, and the exception triggered. In one example implementation, it may be that one or more of the above-mentioned remedial actions are attempted by the processing element first, for example flushing of pending requests from its store buffer, but if those do not work then the exception is triggered to cause one or more of the other mentioned remedial actions to be performed through execution of an appropriate exception handling routine.

As yet further examples of processes that may be initiated as a result of triggering the above-mentioned exception, then in one example implementation the processing element may be arranged, on triggering the exception, to run software at a given privileged level to apply an address translation modification procedure to perform at least one of:

migration of a range of addresses of the given memory region to a further pool of storage locations within the compressed address space; and/or
  migration of a range of addresses of the given memory region to a portion of the storage device providing uncompressed memory.

There are various ways in which a range of addresses of the given memory region may be migrated. Whilst this could for example be done by changing a mapping between the uncompressed physical address space and the corresponding compressed physical address space providing a pool of storage locations, in one example implementation employing virtual to physical address translation techniques, the virtual to physical address translation mappings (which themselves may involve virtual to intermediate and intermediate to physical address translation mappings) can be altered so that certain virtual addresses specified by the software map to different physical addresses in the uncompressed address space, and as a result then map to different storage locations/different pools within the storage device. Whilst the compression circuitry may be located at a single location within the memory hierarchy, for example to compress data prior to being written from the last level of cache out to the storage device, it could be located at other locations within the memory hierarchy, or indeed there may be multiple instances of the compression circuitry associated with different locations. This could for example allow some compression to take place at one or more levels of cache, instead of, or in addition to further compression techniques being applied to lower levels of cache/main memory. For instance, a hierarchical compression scheme may be employed, where compression schemes such as all zeros compression or light-weight compression schemes may be applied at a certain level in the cache hierarchy, whilst other more heavyweight compression schemes (which may be slower, but more effective) are applied at lower levels in the cache hierarchy and/or at the interface with main memory.

Further, even prior to compression being performed, in one example implementation data inspection circuitry may be located in a path between the processing element and the compression circuitry, to determine whether the given block of data will be able to be compressed by the compression circuitry, and in that event to cause at least one bound credit associated with the given block of data to be converted back to an available credit. This can allow an early release of one or more bound credits, hence reducing the likelihood that the processing element is unable to reserve sufficient write credits for subsequent write operations. For example, inspecting dirty data evicted from a level 1 cache to a level 2 cache, in a situation where the level 2 cache stores uncompressed data, in order to determine whether compression of the data is possible, could be used to limit the number of unnecessary credits retained as bound to the cache line. The level 2 cache could then track how many credits are associated with the dirty cache line, with an appropriate adjustment being made as necessary if the cache line data is updated again.

The size and arrangement of the pools of storage locations associated with corresponding memory regions can be varied dependent on implementation. For instance, it may be useful to avoid situations where the capacity of the on-chip caches is larger than the typical pool size, since this could lead to performance issues when initialising a large continuous memory range mapped to a single pool. In particular, in such a situation, the series of write operations could cause all clean credits to be reserved since cached dirty lines each have a sufficient number of bound credits for the worst case (i.e. assuming no compression can be performed). At that point, it may be necessary for the compression hardware or a fault handler to instigate cleaning of the dirty lines to the point of compression in order to release unnecessary credits. However, the chances of such a scenario arising could be mitigated by using larger pools of storage locations (i.e. where their storage capacity is larger than the combined cache size), or by interleaving pools of storage locations.

Particular examples will now be described with reference to the figures.

FIG. 1 is a block diagram of a system in accordance with one example implementation. A processing element 10, which could take a wide variety of different forms, for example a central processing unit (CPU), a graphics processing unit (GPU), an accelerator device, etc., is arranged to perform data processing operations on data accessible in main memory 40. The processing element may be arranged to identify accesses to a given memory region of the memory using addresses specified within an uncompressed physical address space, whilst the storage device 40 used to implement the main memory provides, for the given memory region, a given pool of storage locations within a compressed physical address space. In some implementations, there may in fact be multiple memory regions having corresponding uncompressed physical address spaces, that each have an associated pool of storage locations 52, 54 within the compressed memory portion 50 of the storage device 40. Whilst all of the storage device 40 could be formed of compressed memory, as shown in FIG. 1 it is also possible that there may be one or more uncompressed memory portions 45 within the storage device. The storage device may take a variety of forms, but in one example implementation takes the form of DRAM (Dynamic Random Access Memory).

Compression circuitry 35 is provided to handle the compression of data being written to the compressed memory portion 50 and the subsequent decompression of that data when read from the compressed memory portion 50. In accordance with the techniques described herein, such compression is performed entirely transparently to the processing element 10, and the processing element 10 does not need to be concerned with whether the data it writes is compressed prior to being written to main memory 40, or is not.

When issuing write requests in respect of addresses that map to the uncompressed memory portion 45 of the storage device 40, the storage device will always have capacity to store the data being written. However, when issuing write requests in respect of addresses within a memory region that maps to a pool of storage locations 52, 54 within the compressed memory portion 50, this cannot always be guaranteed, since as mentioned earlier, in order to take advantage of the increasing memory capacity that the use of compression can achieve, the compressed memory portion 50 needs to be overcommitted (i.e. a given pool of storage locations 52, 54 will have insufficient capacity to store all data in uncompressed form pertaining to addresses in the corresponding memory region).

However, there can be a significant latency between the time the processing element 10 issues a write request seeking to write a block of data, and the time at which the compression circuitry 35 determines whether that data can be compressed or not, and once the processing element has issued a write request from its store buffer 14 (at which point the write request becomes visible externally to the processing element) it needs to be guaranteed that the required write operation will occur. In modern, high performance, processing systems is impractical to stall further operation of the processing element until it is known whether the storage device 40 will have capacity to store the data being written.

The latency can arise for a variety of reasons, dependent on how the system is arranged. For example, it is common to employ one or more levels of cache between the processing element 10 and the storage device 40 forming the main memory, and indeed typically a multi-level cache hierarchy is used. Considering the example of FIG. 1, a three level cache hierarchy is illustrated by way of example, with separate level 1 instruction and data caches 15, 20, a combined level 2 cache 25 and a combined level 3 cache 30. When a write request is issued from the store buffer 14 of the processing element 10, typically specifying a cache line's worth of data to be written to an associated address, it is often the case that the data will initially be cached within the cache hierarchy, and in the example of FIG. 1 such write data will only be received by the compression circuitry 35 when in due course it is propagated on to the compression circuitry from the level 3 cache 30, which may be some significant time after the processing element 10 has issued the write request associated with that data. The compression circuitry 35 can then analyse that data to determine whether it can be compressed or not, and if more than one compression scheme is available, can be arranged to determine which one of the compression schemes to use. The amount of space/number of storage locations required within the corresponding pool 52, 54 to then store the block of data will be dependent on how, and if at all, the data can be compressed, but at this stage it needs to be ensured that there will be sufficient space to store the data, irrespective of whether it can be compressed or not.

As discussed earlier, to alleviate this problem, the techniques described herein employ write credits managed by the compression circuitry. In particular, the compression circuitry 35 employs write credit maintenance circuitry 39 that, for each pool of storage locations 52, 54, is arranged to maintain a plurality of write credits for that pool, with those write credits being used to reserve storage locations within that pool. The processing element 10 is constrained, prior to issuing a write request from its store buffer 14 seeking to write a block of data to an address within a given memory region that is mapped to one of the pools of storage locations 52, 54, to obtain a sufficient number of the write credits to ensure that M storage locations within that pool will be available when in due course the compression circuitry is triggered to perform the compression evaluation operation for that block of data, where M is the maximum number of storage locations that will be needed (i.e. when it is determined that the block of data needs to be stored in uncompressed form). When the compression circuitry 35 in due course determines whether the block of data can or cannot be compressed, then any unneeded write credits can be released to make them available for reuse in association with other write requests.

The write credits can be managed in a variety of ways. However, in one example implementation, each write credit for a given pool of storage locations is initialised as an available credit, and is arranged to become a bound credit when associated with data to be stored in the given pool of storage locations. For each given pool of storage locations 52, 54, the compression circuitry can maintain a credit pool of available credits (denoted for simplicity by the box 37 in FIG. 1, although as will be discussed later the credit pool could be stored in a variety of locations, for example in memory in association with the relevant pool of storage locations, optionally accessed via a cache accessible to the compression circuitry 35), and can be arranged to provide one or more of the available credits from the credit pool to the processing element 10. The processing element can then associate one or more of those credits with a block of data to be written, at which point those credits become bound credits.

As shown in FIG. 1, in order to improve speed of access to write credits, the processing element 10 may have a credit cache 60 associated therewith in which it can cache some of the available credits so that they will be readily available for use when needed. There are various points in time at which the processing element 10 could request that some of the available credits from the credit pool 37 be provided to it for storing in its local credit cache 60. For example, often the software executing on the processing element will use virtual addresses that are mapped to physical addresses in dependence on page tables maintained by the operating system and/or hypervisor running on the processing element 10, and this address translation process will be performed using address translation circuitry 12 within the processing element 10. An example of such address translation circuitry is a memory management unit (MMU), which can be arranged to determine, from a received virtual address, a corresponding physical address that should be accessed (and may also undertake other tasks such as assessing whether the identified physical address should be allowed to be accessed given the current task running on the processing element).

The address translation information retrieved from the relevant page tables during this process may be cached locally within a translation lookaside buffer (TLB) available to the MMU. In one example implementation, when a TLB entry is allocated, this can be a suitable opportunity for the processing element 10 to request that the compression circuitry 35 provide one or more available credits for caching in the processing element's credit cache 60, since it is expected that write requests in respect of addresses within the physical address range covered by that TLB entry are likely to be made in due course. Similarly, once a TLB entry has been invalidated, it is expected that write accesses to physical addresses within the physical address range covered by that invalidated TLB entry are not likely in the near future, and hence write credits associated with a corresponding memory region are less likely to be needed. Accordingly TLB invalidation can be used as a trigger to evict one or more available write credits from the credit cache 60 to allow them to be returned to the credit pool 37.

As discussed earlier, in some instances it may be the case that an individual memory region for which the above-mentioned write credit mechanism is used to reserve storage locations is larger than a region of memory covered by a TLB entry. In one such implementation, a certain number of available credits could be cached within the credit cache 60 upon allocation of a first TLB entry within a series of TLB entries, with reference counting being used to keep track of allocation of additional TLB entries. As TLB entries in the series are subsequently deallocated/invalidated, the reference counter can be decremented, and when the reference count returns to 0 then any of the previously reserved available credits can be evicted from the credit cache 60 for returning to the credit pool 37.

Once a physical address has been determined for a provided virtual address relating to a write operation to be performed, then it will be known whether that physical address resides within the compressed memory portion 50 or not, and if it does then in one example implementation the processing element 10 can be arranged at that point to seek to reserve the maximum number M of write credits that could be required in association with the corresponding write. The exact timing at which this reservation takes place can be varied dependent on implementation, but in one example implementation this takes place at least at an early enough point in time that it is possible to take remedial action, such as raising an exception, if there are insufficient credits available. In one particular implementation this task is undertaken at or around the time the address translation takes place. If the write credits required are already in the credit cache 60, then the processing element 10 can allocate the write credits from the credit cache, converting them from available credits into bound credits. If there are insufficient credits in the credit cache, the processing element 10 may issue a request to the compression circuitry 35 to seek to obtain sufficient credits from the credit pool 37. The steps that could be taken in the event that it is determined that insufficient credits are available will be discussed later, with reference to FIG. 5.

As shown in FIG. 1, whilst in one example implementation there is a single level of credit cache 60 associated with the processing element 10, if desired one or more further levels of credit cache 65 may also be provided. This could be beneficial in some example scenarios. For example, there may be multiple processing elements in the system, each of which may be provided with its own local credit cache, and in that case a lower level credit cache such as credit cache 65 shown in FIG. 1 could be shared amongst multiple of the processing elements, to facilitate a quicker promotion of available credits into the local credit caches as and when required.

The credit pool 37 shown in FIG. 1, and indeed the storage used by the write credit maintenance circuitry 39 to keep track of the state (e.g. available or bound) of the various write credits for each pool of storage locations 52, 54, can take a variety of forms. For instance, a portion of main memory may be reserved for this purpose, but the compression circuitry 35 may also have access to its own local cache in which to cache a subset of that write credit information.

Whilst the compression circuitry 35 may be located as shown in FIG. 1, so as to perform compression/decompression at the interface between the lowest level of cache and main memory, it could be located at other locations within the memory hierarchy, or indeed there may be multiple instances of the compression circuitry associated with different locations. This could for example allow some forms of compression to take place at one or more levels of cache, instead of, or in addition to further compression techniques applied to lower levels of cache/main memory.

Further, even prior to compression being performed, in one example implementation data inspection circuitry 70 may be located in a path between the processing element and the compression circuitry, to determine whether a given block of data will be able to be compressed by the compression circuitry, and in that event to cause at least one bound credit associated with the given block of data to be converted back to an available credit. This can allow an early release of one or more bound credits, hence reducing the likelihood that the processing element is unable to reserve sufficient write credits for subsequent write operations. The exact location of such data inspection circuitry can vary dependent on implementation, but in the example shown in FIG. 1 such data inspection circuitry may be associated with the level 2 cache 25, and operable at the time dirty data is evicted from the level 1 data cache 20 to the level 2 cache 25.

Figure 2:
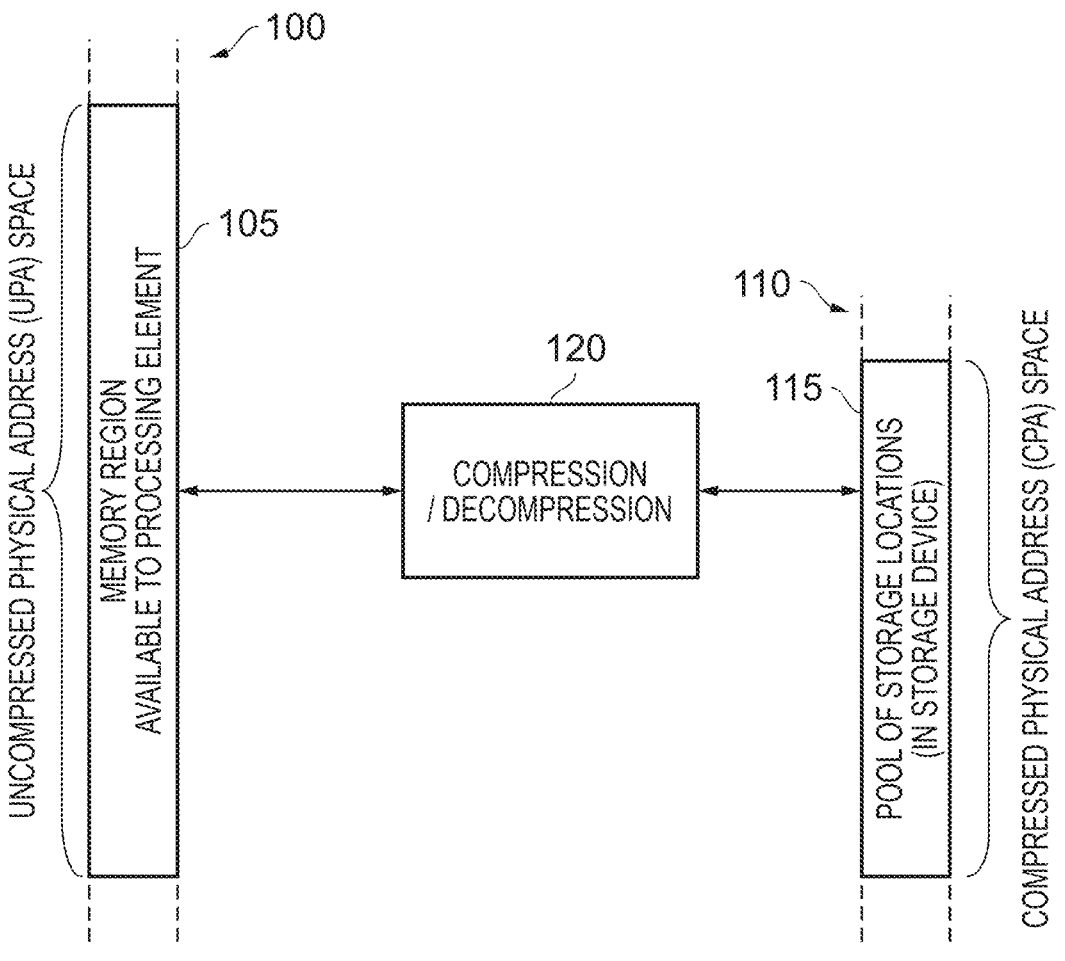
FIG. 2 is a diagram schematically illustrating how an uncompressed physical address space used by a processing element may be mapped to a smaller pool of storage locations within a compressed physical address space within a storage device.

FIG. 2 schematically illustrates the correspondence between memory regions in the uncompressed physical address (uPA) space and corresponding pools of storage locations in the compressed physical address (cPA) space. Within the uPA space 100, a number of memory regions 105 may be defined, covering a range of physical addresses that may be used by the processing element. Through use of compression/decompression 120 performed by the compression circuitry 35, the data associated with such a range of physical addresses can be mapped to a smaller pool of storage locations 115 within the cPA space 110, the cPA space facilitating the provision of multiple pools of storage locations, each associated with a corresponding memory region in the uPA space.

Figure 3:
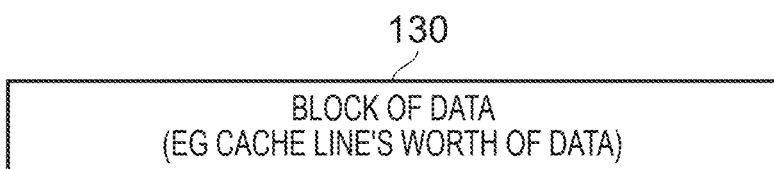
FIG. 3 schematically illustrates different storage requirements for different formats in which a block of data may be stored within a storage device, in accordance with one example arrangement.
Figure 3:
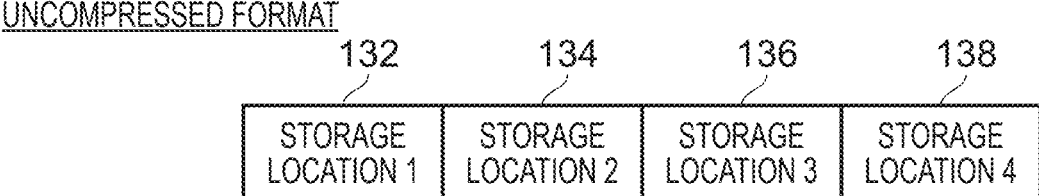
Figure 3:
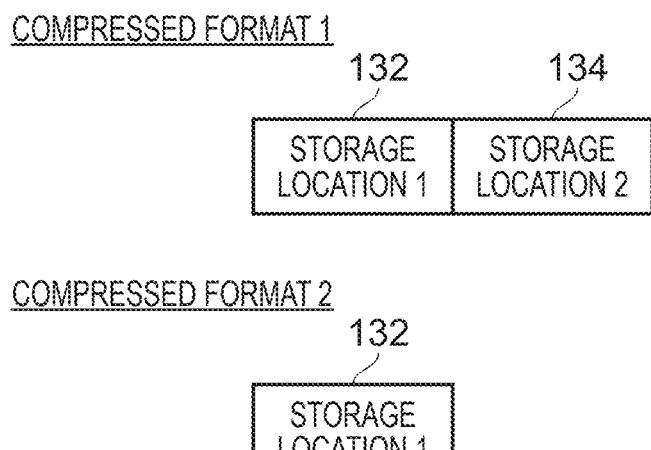

For any given block of data considered by the compression circuitry, the compression circuitry will perform a compression evaluation operation to determine, in dependence on the data values forming that block of data, a selected format in which the block of data is to be written to the relevant pool of storage locations. The selected format will be chosen from an uncompressed format, and at least one compressed format. FIG. 3 illustrates one example implementation, where there is a single uncompressed format but two different compressed formats. In this example, a block of data 130, which could for example represent a cache line's worth of data may require the use of four storage locations 132, 134, 136, 138 in order to store that block of data in uncompressed form. However, if it is possible to compress that data in accordance with compressed format 1 shown in FIG. 3, then only the first two storage locations 132, 134 are required. Similarly, if it is possible to compress that data in accordance with compressed format 2 shown in FIG. 3, then only a single storage location 132 is required. In a yet further example, not shown, an all zeros compression technique may be supported, where on detecting that all of the data in the data block has a logic zero value, it may be possible merely to store some metadata identifying that that block of data is all zero, and not require the use of any storage location within the pool to actually store the data.

Figure 4:
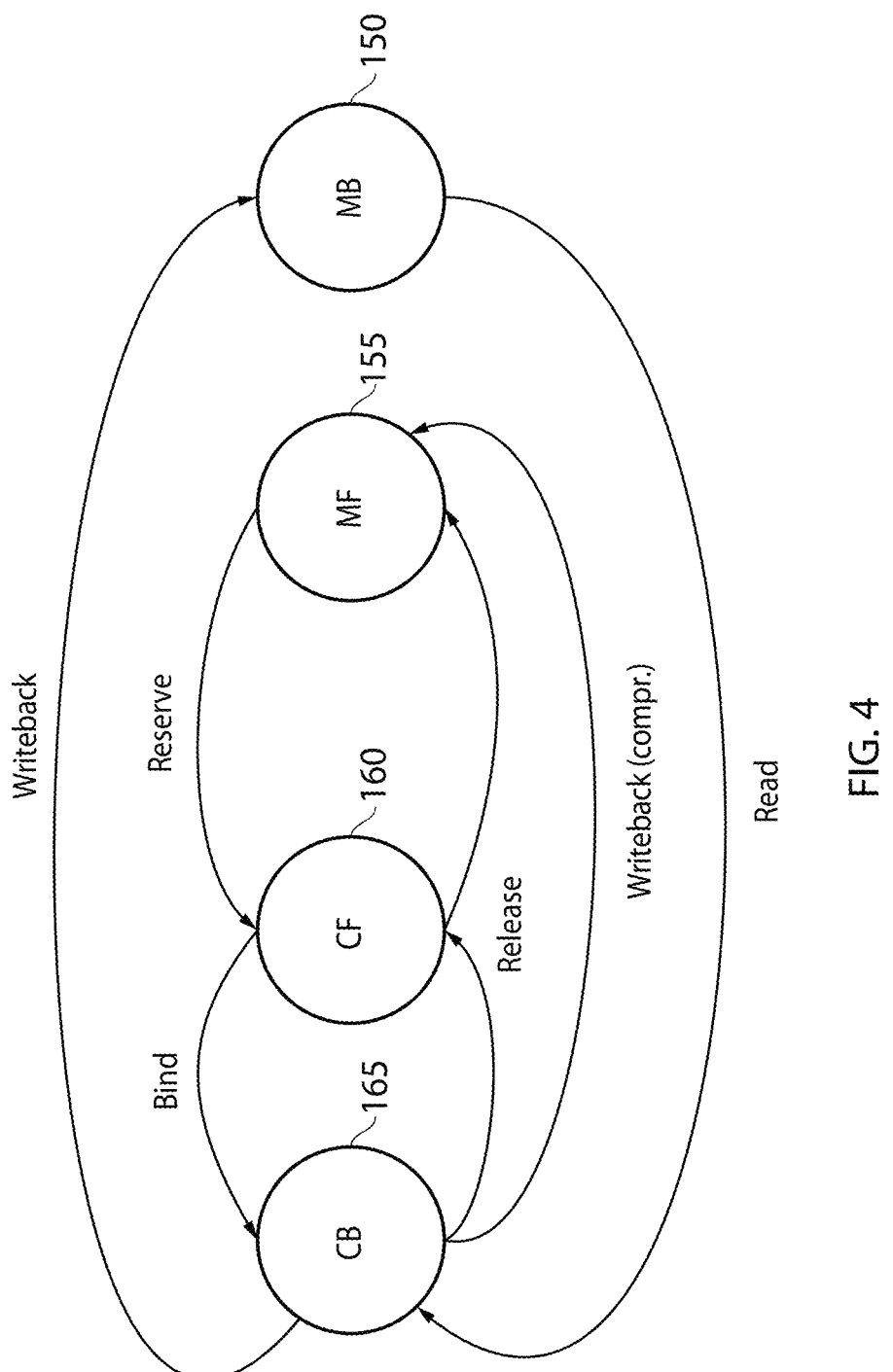
FIG. 4 schematically illustrates how a write credit may transition between a number of different states in accordance with the techniques described herein.

As discussed earlier, in one example implementation each write credit is initialised as an available credit, and is arranged to become a bound credit when associated with data to be stored in a given pool of storage locations. In one particular example implementation as shown in FIG. 4, then four possible states may be defined for each write credit, allowing a distinction between available and bound credits associated with memory and available and bound credits associated with a cache. In particular, the four states shown in FIG. 4 are:

a memory free (MF) state in which the write credit is an available credit in the credit pool 37;

a memory bound (MB) state in which the write credit is a bound credit associated with data stored in a given pool of storage locations 52, 54;

a cached free (CF) state in which the write credit is an available credit in the credit cache 60; and a cached bound (CB) credit in which the write credit is a bound credit associated with data cached in a data cache 20, 25, 30 located in a path between the processing element 10 and the compression circuitry 35.

With reference to FIG. 4, as discussed earlier all write credits are initially initialised as available credits, and will hence be in the MF state 155. Some of those available credits may be reserved by the processing element 10 for storage in its local credit cache 60, at which point the state of those write credits changes to the CF state 160. When the processing element associates a write credit with a block of data to be output from its store buffer 14, then that write credit becomes a bound credit, and in particular the state of that write credit changes to the CB state 165. If in due course it is determined that a write credit in the CB state is no longer needed for the associated block of data, then it can be released back to the credit cache (transitioning to the CF state 160) or be returned directly to the credit pool 37 (transitioning to the MF state 155). For instance, if it is determined prior to issuing a write request from the store buffer 14 that one of the initially reserved CB write credits is no longer required, then that write credit can be returned to the credit cache 60 and changed to the CF state. Alternatively, if at the time of compression by the compression circuitry 35 (referred to in FIG. 4 as the writeback stage), it is determined that the data can be compressed, and hence one or more CB write credits are no longer required, those CB write credits can be converted back to MF credits in the credit pool 37. Any remaining CB write credits that do still need to be associated with the data at the time of write back to memory are converted to MB write credits 150.

When compressed data is read back from the storage device 40 for storing in a cache, it may be decompressed immediately, or instead may be retained in at least one of the lower levels of cache in compressed form, dependent on implementation (in the latter case it may be that the data is only decompressed when it reaches a level of cache closer to the processing element, for example the L2 or L1 cache). If the data is retained in a cache in compressed form, then the associated MB credits 150 are merely converted to CB credits 165. When the data is decompressed, then in one example implementation there may be no need to obtain further CB credits (i.e. the total number of retained CB credits is still equal to the number of MB credits used when the data was previously stored to memory) whilst the cache line is still clean (i.e. the data has not been updated), since it is known that those CB credits are the only ones that will be required in order to recompress that data again on storing the data back to main memory. However, as soon as the cache line contents are updated, and become dirty, then it will be necessary to reserve additional CB credits so as to ensure that there are enough CB credits to cover the worst-case scenario where M storage locations will be required to store the data back to memory (i.e. if that data cannot be compressed).

Figure 5:
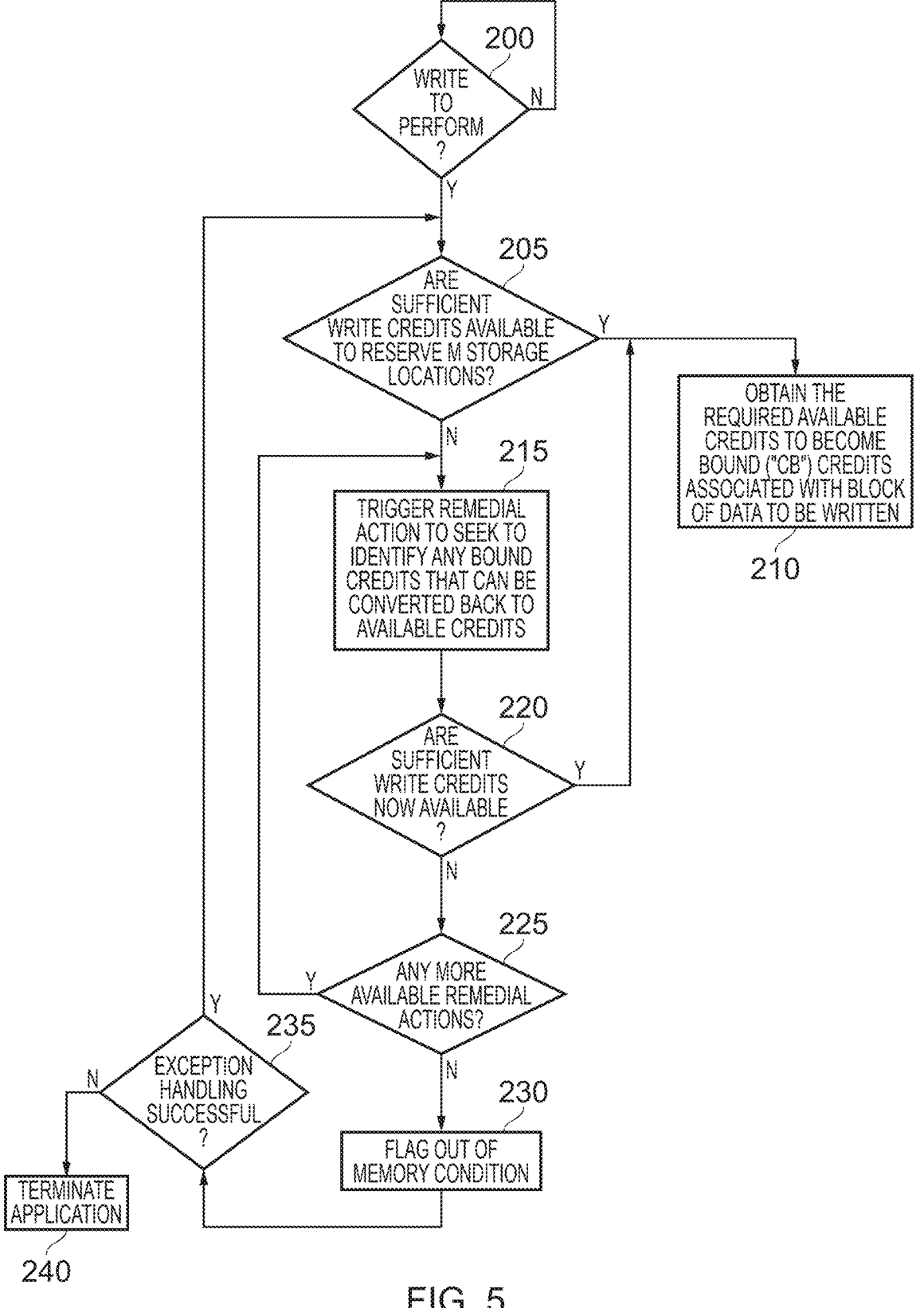
FIG. 5 is a flow diagram illustrating steps that may be performed in one example implementation when it is determined that a write operation is to be performed by a processing element.

FIG. 5 is a flow diagram illustrating steps undertaken when the processing element determines that there is a write operation to be performed at step 200. At step 205, it is determined whether there are sufficient write credits available to reserve M storage locations. As discussed earlier, this evaluation may in one example implementation be performed at around the time of address translation, and may involve reference to the local credit cache 60 and/or requesting available credits from the credit pool 37 maintained by the compression circuitry 35. If sufficient credits are available, then those credits are converted to CB credits and associated with the block of data to be written at step 210.

If it is determined at step 205 that there are insufficient write credits, then the process proceeds to step 215, where a remedial action is triggered to seek to identify any bound credits that can be converted back to available credits. The remedial action can take a variety of forms, and indeed a number of different remedial actions could be taken at this point. For example, the processing element 10 may seek to flush pending write requests from the store buffer 14 to seek to free up one or more write credits. As will be discussed in more detail with reference to FIG. 8, such a process can lead to some bound credits being converted back to available credits since, when seeking to issue a write request from the store buffer, a lookup operation will typically occur within the cache hierarchy to see whether the data has already been cached. If so, it is possible that that the cached copy may already have one or more CB write credits associated with it, enabling some of the provisionally reserved CB write credits to be converted back to available (e.g. CF) credits.

As another example of a remedial action that could be taken, a cache clean (writeback) operation may be instigated in respect of one or more cache lines, causing the compression circuitry 35 to evaluate whether the contents of those cache lines can be compressed, and if so enabling any bound credits no longer necessary to be released back as available credits.

As a still further example, as noted earlier it may be the case that multiple processing elements are provided within the system, each having a local credit cache 60. In such scenarios, it may be possible to request flushing of a credit cache associated with another processing element, in order to release some available write credits.

Once a remedial action has been taken, it is determined at step 220 whether there are now sufficient write credits available, and if so the process can proceed to the earlier discussed step 210. However, if there are still insufficient write credits available, then at step 225 it is determined whether there are any more remedial actions to be taken, and if so the process returns to step 215 to trigger the next remedial action.

If step 225 is reached, and there are no more available remedial actions to take, then the process may proceed to step 230 where an out of memory condition is flagged. Typically this is done by raising an exception, causing an exception handling routine to be performed in order to seek to resolve the out of memory condition, and in particular to seek to free up some additional write credits that can be used as CB credits to be associated with the data that the processing element is seeking to write at step 200. There are various types of exception handling routine that could be performed at this point, and indeed at least some of the earlier described remedial actions may, instead of being triggered by the processing element 10, be performed in software using a suitable exception handling routine following raising of the exception at step 230. Indeed, in one example implementation it may be that steps 215, 220 and 225 are not performed, and the process proceeds directly from step 205 to step 230 to trigger exception handling.

In one example implementation, one procedure that could be implemented in response to the out of memory condition is to run software at a suitable privilege level to apply an address translation modification procedure in order to seek to alleviate the issue. This could for example involve the migration of a range of addresses of a chosen memory region to a different pool of storage locations within the compressed address space, and/or migration of a range of addresses of the chosen memory region to a portion of the storage device providing uncompressed memory. In one example implementation employing virtual to physical address translation techniques, this may be achieved by altering the virtual to physical address translation mappings (which themselves may involve virtual to intermediate and intermediate to physical address translation mappings) so that certain virtual addresses specified by the software then map to different physical addresses in the uncompressed address space, and as a result map to different storage locations within the storage device.

Once the exception handling procedure has been performed following the raising of the out of memory condition at step 230, it can be determined at step 235 whether the exception handling process was successful, i.e. whether it has enabled a number of write credits to be freed for reuse, and if so the process can return to step 205. However, if the exception handling is unsuccessful, then the application may be terminated at step 240.

Figure 6:
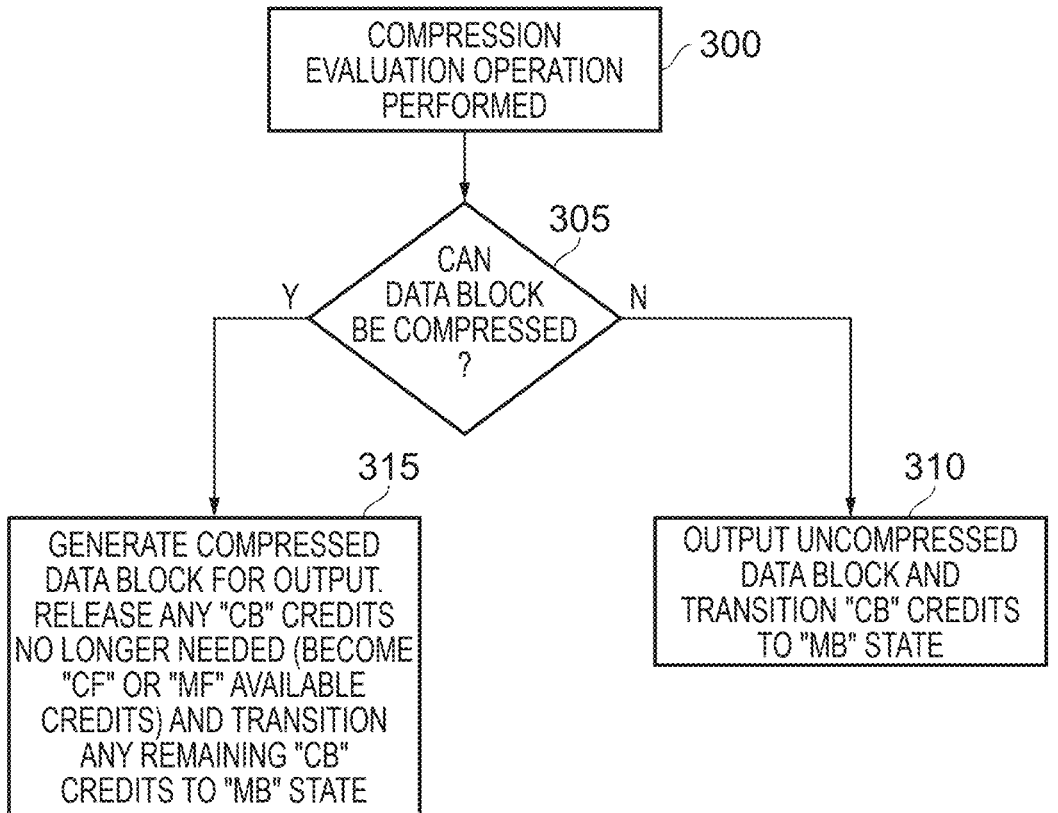
FIG. 6 is a flow diagram illustrating steps that may be performed during a compression evaluation operation, in accordance with one example implementation.

FIG. 6 illustrates how the compression evaluation operation may be performed by the compression circuitry 35 in one example implementation. When the compression evaluation operation is to be performed at step 300, the compression circuitry evaluates whether the data block in question can be compressed at step 305. If it cannot be compressed, then the uncompressed data block is output and the associated CB write credits are converted to MB state at step 310. However, if the data can be compressed then the compressed data block representation is generated for output at step 315. At this point, any CB credits no longer needed are released, becoming either CF or MF available credits depending on whether they are returned to a credit cache (for example a credit cache local to the compression circuitry 35, but in some implementations potentially the credit cache 60 associated with the processing element 10) or the credit pool 37. Any remaining CB credits required are converted to MB state and associated with the compressed data block output for storage in memory.

As discussed earlier, when data is subsequently read back from memory, then the MB credits can merely be converted back to CB credits when the data is stored into one of the caches. Considering compressed data, this may or may not be decompressed at the time it is first loaded into the cache from main memory (for example data may be allowed to be retained in compressed form in one or more of the lower levels of cache, for example the level 3 cache), but when it is subsequently decompressed no additional CB credits will be needed whilst the cache line data is retained in the clean state, since it is known that in due course when that data is written back to memory only that number of CB credits will be needed due to the data being able to be compressed. However, as soon as the data is updated and becomes dirty data, then that initial number of CB credits will need to be supplemented in order to associate sufficient CB credits with the cache line to allow up to M storage locations to be used when the data is subsequently written back to memory.

Figure 7A:
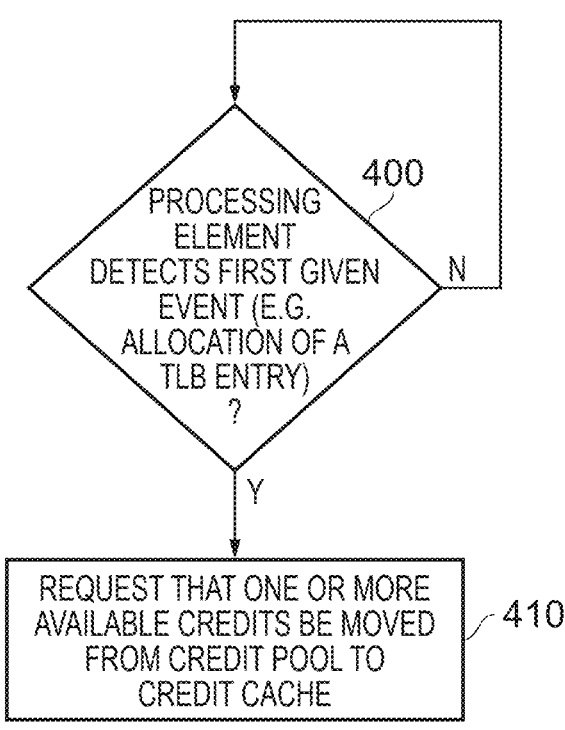
FIGS. 7A and 7B are flow diagrams illustrating how a credit cache may be used to improve speed of access to write credits by a processing element, in accordance with one example implementation.

As discussed earlier, there can be various events that trigger allocation of available credits into the credit cache 60, or the eviction of available credits from the credit cache 60. One example of suitable triggers is discussed with reference to FIGS. 7A and 7B. With reference to FIG. 7A, when the processing element detects a first given event at step 400, then it issues a request at step 410 seeking to have one or more available credits allocated from the credit pool 37 into the credit cache 60. The compression circuitry 35 would typically receive this request, and can be arranged in response to release one or more credits to the processing element for storing in its credit cache 60. The first given event could take a variety of forms, but as discussed earlier could be detected on allocation of a TLB entry.

Figure 7B:
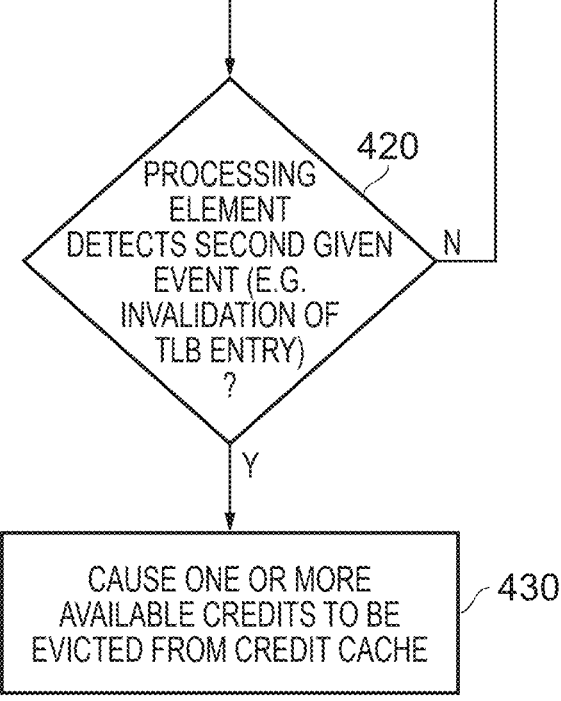

As shown in FIG. 7B, in a similar manner, if the processing element detects a second given event at step 420, then at step 430 it may cause one or more available credits to be evicted from the credit cache 60. In the absence of any intervening lower level credit caches, those evicted credits will then be returned to the compression circuitry for storing in the credit pool 37. The second given event could take a variety of forms, but as discussed earlier could be detected on invalidation of a TLB entry.

In some instances, it may be that an individual memory region for which the write credit mechanism is used is larger than a region of memory covered by a TLB entry. In such instances, on a first relevant TLB entry allocation, one or more available credits may be requested from the credit pool 37 for storing in an entry of the credit cache 60 as per the mechanism described above. In addition, a reference counter can be maintained in association with that entry in the credit cache. Each time a TLB entry is allocated for an address range falling within the corresponding memory region for which the cached write credits are being used, the reference counter may be incremented, and each time such a TLB entry is invalidated the reference counter may be decremented. When the reference counter is decremented to zero this can be used as a trigger to evict the associated credits from the credit cache for returning to the credit pool 37.

Figure 8:
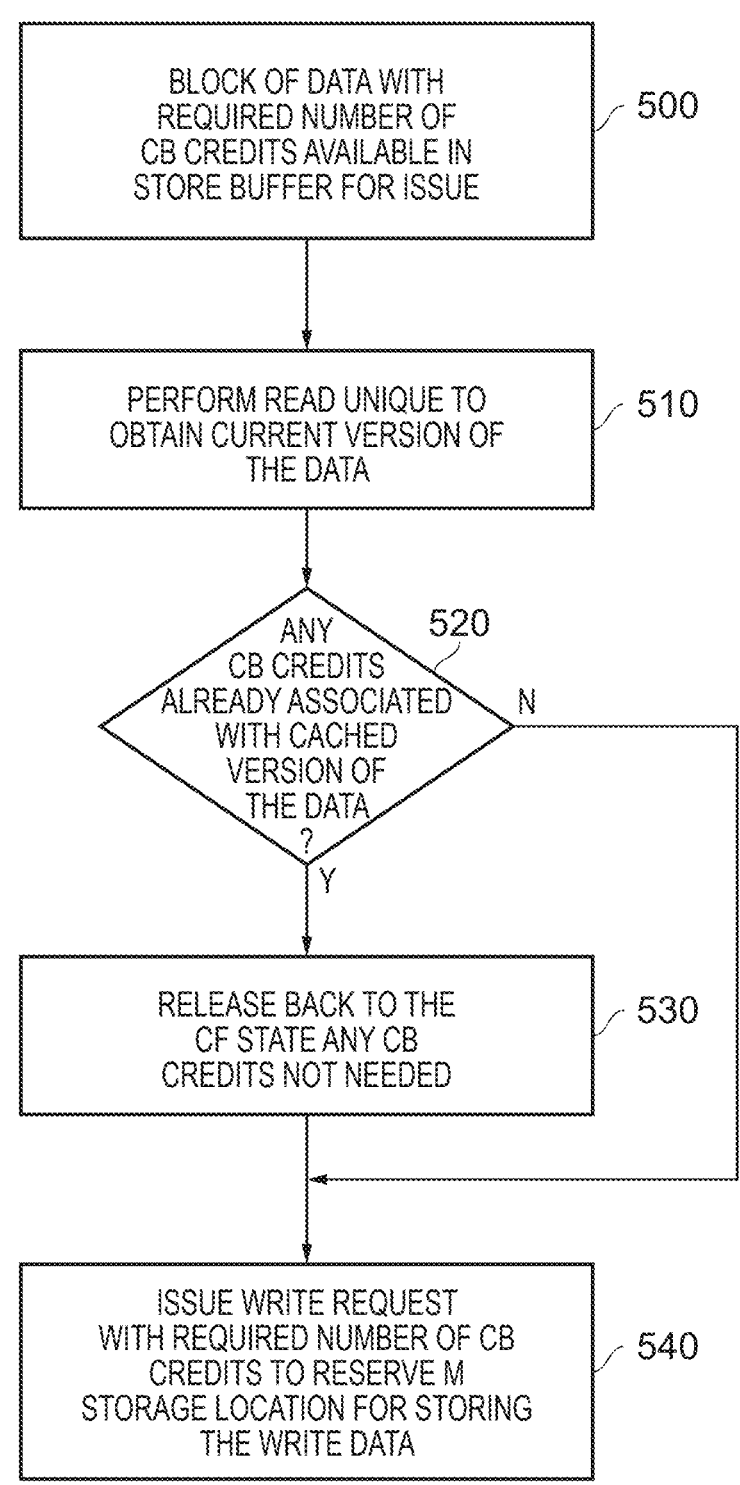
FIG. 8 is a flow diagram illustrating a sequence of steps that may be employed in one example implementation when a processing element is to issue a write request in respect of a block of data available in its store buffer.

FIG. 8 is a flow diagram illustrating a sequence of steps that may be implemented once step 210 of FIG. 5 has been reached. In particular, at this point, as indicated by step 500, a block of data with the maximum required number of CB credits (i.e. the required number of CB credits to ensure that M storage locations will be available within the relevant pool) is available in the store buffer 14 for issue from the processing element 10. In accordance with the techniques described in FIG. 8, at this point a read unique operation is performed at step 510 in order to seek to obtain a current version of the data that is being updated. Typically this will involve retrieving a cache line's worth of data that covers the address of the data being written, allowing an updated cache line of data to be generated. At this stage, it is possible that a hit may occur within a cache entry of one of the cache levels, causing the data in that cache entry to be retrieved, along with an indication of any CB credits already associated with that cache line.

At step 520, it is hence determined whether any CB credits are already associated with a cached version of the data. If not, the process can proceed directly to step 540 where the write request is issued with the required number of CB credits to reserve M storage locations for storing of the write data. However, if one or more CB credits are already associated with a cached version of the data, then the process proceeds to step 530 where any additional CB credits not needed are released back to the CF state prior to the process proceeding to step 540.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 9:
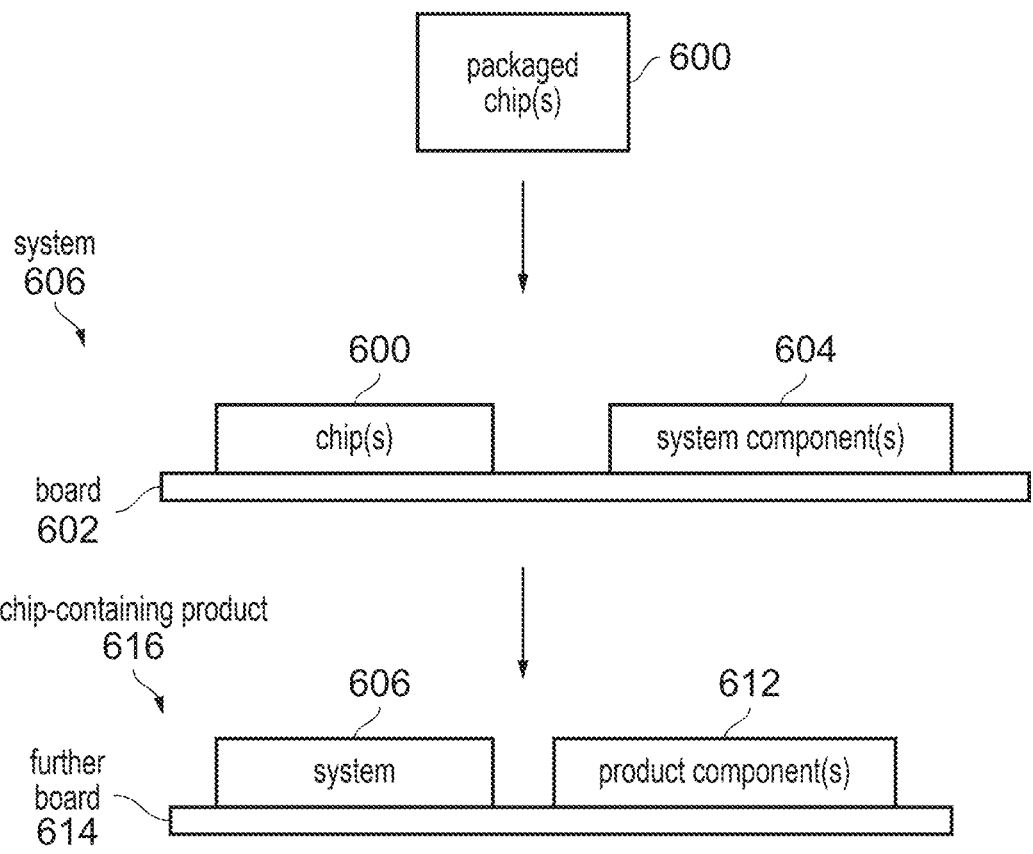
FIG. 9 illustrates a system and a chip-containing product.

As shown in FIG. 9, one or more packaged chips 600, with the apparatus described above implemented in one chip or distributed over two or more of the chips, are manufactured by a semiconductor chip manufacturer. In some examples, the chip product 600 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 600 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. modular chips combined to provide the functionality of a single chip) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 600 are assembled on a board 602 together with at least one system component 604 to provide a system 606. For example, the board may comprise a printed circuit board. The board substrate may be made of any of a variety of materials, e.g. plastic, glass, ceramic, or a flexible substrate material such as paper, plastic or textile material. The at least one system component 604 comprise one or more external components which are not part of the one or more packaged chip(s) 600. For example, the at least one system component 604 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 616 is manufactured comprising the system 606 (including the board 602, the one or more chips 600 and the at least one system component 604) and one or more product components 612. The product components 612 comprise one or more further components which are not part of the system 606. As a non-exhaustive list of examples, the one or more product components 612 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 606 and one or more product components 612 may be assembled on to a further board 614.

The board 602 or the further board 614 may be provided on or within a device housing or other structural support (e.g. a frame or blade) to provide a product which can be handled by a user and/or is intended for operational use by a person or company.

The system 606 or the chip-containing product 616 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and System Verilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some example configurations are set out in the following numbered clauses:

1. An apparatus comprising:
   a processing element to perform data processing operations on data accessible in memory, wherein the processing element is arranged to identify accesses to a given memory region of the memory using addresses specified within an uncompressed address space, whilst a storage device used to implement the memory provides, for the given memory region, a given pool of storage locations within a compressed address space; and compression circuitry arranged, for a block of data to be written to an address within the given memory region, to perform a compression evaluation operation to determine, in dependence on the block of data, a selected format in which the block of data is to be written to the given pool of storage locations, wherein the selected format is chosen from an uncompressed format where a plurality M of storage locations are to be used to store the block of data, and one or more compressed formats where a number of storage locations less than M are to be used to store the block of data;

wherein:

the compression circuitry is arranged to maintain a plurality of write credits in association with the given pool of storage locations, where the number of write credits is dependent on the number of storage locations within the given pool and the write credits are used to reserve storage locations within the given pool; and the processing element is constrained, prior to issuing a write request seeking to write a given block of data to a given address within the given memory region, to obtain a sufficient number of the write credits to ensure that M storage locations within the given pool will be available when in due course the compression circuitry is triggered to perform the compression evaluation operation for the given block of data.

2. An apparatus as in Clause 1, wherein:

each write credit is initialised as an available credit, and is arranged to become a bound credit when associated with data to be stored in the given pool of storage locations; and the sufficient number of the write credits obtained by the processing element for association with the given block of data are considered to be bound credits unavailable for use in association with other blocks of data.

3. An apparatus as in Clause 2, wherein the compression circuitry is arranged, when performance of the compression evaluation operation identifies that a given compressed format of the one or more compressed formats is to be used to store the given block of data, to cause at least one bound credit associated with the given block of data to be converted back to an available credit.

4. An apparatus as in Clause 2 or Clause 3, wherein the compression circuitry is arranged, on performing the compression evaluation operation, to determine how many of the obtained write credits to maintain as bound credits in dependence on the number of storage locations in the given pool required to store the given block of data in the selected format.

5. An apparatus as in any of clauses 2 to 4, wherein:

the compression circuitry is arranged to maintain a credit pool of available credits; and the apparatus further comprises a credit cache accessible to the processing element, wherein the credit cache is employed to cache one or more of the available credits transferred from the credit pool in order to reserve those one or more of the available credits for use by the processing element.

6. An apparatus as in Clause 5, wherein occurrence of an eviction trigger event is arranged to cause one or more available credits to be evicted from the credit cache, to enable those one or more available credits to be returned to the credit pool.

7. An apparatus as in Clause 5 or Clause 6, wherein the processing element is arranged, on detection of a first given event, to request from the compression circuitry a transfer into the credit cache of one or more available credits from the credit pool.

8. An apparatus as in any of clauses 5 to 7, wherein the processing element is arranged, on detection of a second given event, to cause one or more available credits to be evicted from the credit cache.

9. An apparatus as in any of clauses 5 to 8, wherein each write credit is able to be transitioned between a plurality of states comprising:

a memory free (MF) state in which the write credit is an available credit in the credit pool;

a memory bound (MB) state in which the write credit is a bound credit associated with data stored in the given pool of storage locations;

a cached free (CF) state in which the write credit is an available credit in the credit cache; and a cached bound (CB) credit in which the write credit is a bound credit associated with data cached in a data cache located in a path between the processing element and the compression circuitry.

10. An apparatus as in any of clauses 2 to 9, further comprising:

at least one data cache located in a path between the processing element and the compression circuitry;

wherein the at least one data cache is arranged to maintain, in association with each block of data cached therein, an indication of any bound credits associated with that block of data.

11. An apparatus as in Clause 10, wherein, when a current block of data associated with the given address is cached in the at least one data cache and the given block of data associated with the write request represents updated data for the given address, the processing element is arranged to take into account any bound credits indicated by the data cache as already being associated with the current block of data when determining the sufficient number of write credits.

12. An apparatus as in any of clauses 2 to 11, wherein in the event that the processing element is unable to obtain the sufficient number of write credits required to enable the write request to be issued, the processing element is arranged to trigger a remedial action to seek to identify any bound credits that can be converted back to available credits.

13. An apparatus as in Clause 12, wherein the remedial action comprises at least one of:

flushing any pending write requests from store buffer circuitry of the processing element;

propagating one or more write requests to the compression circuitry to cause the compression evaluation operation to be performed; and requesting flushing of a credit cache associated with another processing element within the apparatus.

14. An apparatus as in any preceding clause, wherein on detection of a write credit deficiency event the processing element is arranged to trigger an exception to flag an out of memory condition.

15. An apparatus as in Clause 14, wherein the processing element is arranged, on triggering the exception, to run software at a given privileged level to apply an address translation modification procedure to perform at least one of:

migration of a range of addresses of the given memory region to a further pool of storage locations within the compressed address space; and migration of a range of addresses of the given memory region to a portion of the storage device providing uncompressed memory.

16. An apparatus as in any of clauses 2 to 15, further comprising data inspection circuitry located in a path between the processing element and the compression circuitry, to determine whether the given block of data will be able to be compressed by the compression circuitry, and in that event to cause at least one bound credit associated with the given block of data to be converted back to an available credit.

17. A method of managing compression of data in an apparatus, comprising:

performing within a processing element data processing operations on data accessible in memory, wherein the processing element identifies accesses to a given memory region of the memory using addresses specified within an uncompressed address space, whilst a storage device used to implement the memory provides, for the given memory region, a given pool of storage locations within a compressed address space;

performing a compression evaluation operation within compression circuitry to determine, for a block of data to be written to an address within the given memory region, a selected format in which the block of data is to be written to the given pool of storage locations, wherein the selected format is chosen from an uncompressed format where a plurality M of storage locations are to be used to store the block of data, and one or more compressed formats where a number of storage locations less than M are to be used to store the block of data;

maintaining a plurality of write credits in association with the given pool of storage locations, where the number of write credits is dependent on the number of storage locations within the given pool and the write credits are used to reserve storage locations within the given pool; and constraining the processing element, prior to issuing a write request seeking to write a given block of data to a given address within the given memory region, to obtain a sufficient number of the write credits to ensure that M storage locations within the given pool will be available when in due course the compression circuitry is triggered to perform the compression evaluation operation for the given block of data.

18. A system comprising:

the apparatus of any of clauses 1 to 16, implemented in at least one packaged chip;

at least one system component; and a board, wherein the at least one packaged chip and the at least one system component are assembled on the board.

19. A chip-containing product comprising the system of clause 18, wherein the system is assembled on a further board with at least one other product component.

20. A computer-readable medium storing computer-readable code for fabrication of the apparatus of any of clauses 1 to 16.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:

processing circuitry configured to perform data processing operations on data accessible in memory, wherein the processing circuitry is configured to identify accesses to a given memory region of the memory using addresses specified within an uncompressed address space, and a storage device that implements the memory is configured to provide, for the given memory region, a given pool of storage locations within a compressed address space; and compression circuitry configured, for a block of data to be written to an address within the given memory region, to perform a compression evaluation operation to determine, in dependence on the block of data, a selected format in which the block of data is to be written to the given pool of storage locations, wherein the selected format is chosen from an uncompressed format where a plurality of M storage locations are to be used to store the block of data, where M is an integer greater than or equal to one, and one or more compressed formats where a number of storage locations less than M are to be used to store the block of data;

wherein:

the compression circuitry is configured to maintain a plurality of write credits in association with the given pool of storage locations, where the number of write credits is dependent on the number of storage locations within the given pool and the write credits are used to reserve storage locations within the given pool; and the processing circuitry is constrained, prior to issuing a write request seeking to write a given block of data to a given address within the given memory region, to obtain a sufficient number of the write credits to ensure that M storage locations within the given pool will be available when in due course the compression circuitry is triggered to perform the compression evaluation operation for the given block of data.

2. An apparatus as claimed in claim 1, wherein:

each write credit is initialised as an available credit, and is arranged to become a bound credit when associated with data to be stored in the given pool of storage locations; and the sufficient number of the write credits obtained by the processing circuitry for association with the given block of data are considered to be bound credits unavailable for use in association with other blocks of data.

3. An apparatus as claimed in claim 2, wherein the compression circuitry is arranged, when performance of the compression evaluation operation identifies that a given compressed format of the one or more compressed formats is to be used to store the given block of data, to cause at least one bound credit associated with the given block of data to be converted back to an available credit.

4. An apparatus as claimed in claim 2, wherein the compression circuitry is arranged, on performing the compression evaluation operation, to determine how many of the obtained write credits to maintain as bound credits in dependence on the number of storage locations in the given pool required to store the given block of data in the selected format.

5. An apparatus as claimed in claim 2, wherein:
the compression circuitry is arranged to maintain a credit pool of available credits; and
the apparatus further comprises a credit cache accessible to the processing circuitry, wherein the credit cache is employed to cache one or more of the available credits transferred from the credit pool in order to reserve those one or more of the available credits for use by the processing circuitry.

6. An apparatus as claimed in claim 5, wherein occurrence of an eviction trigger event is arranged to cause one or more available credits to be evicted from the credit cache, to enable those one or more available credits to be returned to the credit pool.

7. An apparatus as claimed in claim 5, wherein the processing circuitry is arranged, on detection of a first given event, to request from the compression circuitry a transfer into the credit cache of one or more available credits from the credit pool.

8. An apparatus as claimed in claim 5, wherein the processing circuitry is arranged, on detection of a second given event, to cause one or more available credits to be evicted from the credit cache.

9. An apparatus as claimed in claim 5, wherein each write credit is able to be transitioned between a plurality of states comprising:
a memory free (MF) state in which the write credit is an available credit in the credit pool;
a memory bound (MB) state in which the write credit is a bound credit associated with data stored in the given pool of storage locations;
a cached free (CF) state in which the write credit is an available credit in the credit cache; and
a cached bound (CB) credit in which the write credit is a bound credit associated with data cached in a data cache located in a path between the processing circuitry and the compression circuitry.

10. An apparatus as claimed in claim 2, further comprising:
at least one data cache located in a path between the processing circuitry and the compression circuitry;
wherein the at least one data cache is arranged to maintain, in association with each block of data cached therein, an indication of any bound credits associated with that block of data.

11. An apparatus as claimed in claim 10, wherein, when a current block of data associated with the given address is cached in the at least one data cache and the given block of data associated with the write request represents updated data for the given address, the processing circuitry is arranged to take into account any bound credits indicated by the data cache as already being associated with the current block of data when determining the sufficient number of write credits.

12. An apparatus as claimed in claim 2, wherein in the event that the processing circuitry is unable to obtain the sufficient number of write credits required to enable the write request to be issued, the processing circuitry is arranged to trigger a remedial action to seek to identify any bound credits that can be converted back to available credits.

13. An apparatus as claimed in claim 12, wherein the remedial action comprises at least one of:
flushing any pending write requests from store buffer circuitry of the processing circuitry;
propagating one or more write requests to the compression circuitry to cause the compression evaluation operation to be performed; and
requesting flushing of a credit cache associated with another processing circuitry within the apparatus.

14. An apparatus as claimed in claim 1, wherein on detection of a write credit deficiency event the processing circuitry is arranged to trigger an exception to flag an out of memory condition.

15. An apparatus as claimed in claim 14, wherein the processing circuitry is arranged, on triggering the exception, to run software at a given privileged level to apply an address translation modification procedure to perform at least one of:
migration of a range of addresses of the given memory region to a further pool of storage locations within the compressed address space; and
migration of a range of addresses of the given memory region to a portion of the storage device providing uncompressed memory.

16. An apparatus as claimed in claim 2, further comprising data inspection circuitry located in a path between the processing circuitry and the compression circuitry, to determine whether the given block of data will be able to be compressed by the compression circuitry, and in that event to cause at least one bound credit associated with the given block of data to be converted back to an available credit.

17. A method of managing compression of data in an apparatus, comprising:
performing within processing circuitry data processing operations on data accessible in memory, wherein the processing circuitry identifies accesses to a given memory region of the memory using addresses specified within an uncompressed address space, and a storage device that to implements the memory provides, for the given memory region, a given pool of storage locations within a compressed address space;
performing a compression evaluation operation within compression circuitry to determine, for a block of data to be written to an address within the given memory region, a selected format in which the block of data is to be written to the given pool of storage locations, wherein the selected format is chosen from an uncompressed format where a plurality M of M storage locations are to be used to store the block of data, where M is an integer greater than or equal to one, and one or more compressed formats where a number of storage locations less than M are to be used to store the block of data;
maintaining a plurality of write credits in association with the given pool of storage locations, where the number of write credits is dependent on the number of storage locations within the given pool and the write credits are used to reserve storage locations within the given pool; and constraining the processing circuitry, prior to issuing a write request seeking to write a given block of data to a given address within the given memory region, to obtain a sufficient number of the write credits to ensure that M storage locations within the given pool will be available when in due course the compression circuitry is triggered to perform the compression evaluation operation for the given block of data.

18. A system comprising:

the apparatus of claim 1, implemented in at least one packaged chip;

at least one system component; and a board, wherein the at least one packaged chip and the at least one system component are assembled on the board.

19. A chip-containing product comprising the system of claim 18, wherein the system is assembled on a further board with at least one other product component.

20. A non-transitory, computer-readable medium storing computer-readable code for fabrication of the apparatus of claim 1.

\* \* \* \* \*